(12) United States Patent
Honekamp et al.

(10) Patent No.: US 6,591,927 B1
(45) Date of Patent: Jul. 15, 2003

(54) DRIVER CONTROL MODULE

(75) Inventors: Curtis J. Honekamp, Fort Wayne, IN (US); William Cousins, Huntertown, IN (US); Harold F. Macris, Fort Wayne, IN (US); Theodore L. Badgley, Fort Wayne, IN (US); Trevor T. Downes, Fort Wayne, IN (US); William R. Fleming, Fort Wayne, IN (US); Jeffrey J. Sexton, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 278 days.

(21) Appl. No.: 09/603,291

(22) Filed: Jun. 23, 2000

Related U.S. Application Data

(60) Provisional application No. 60/140,910, filed on Jun. 24, 1999.

(51) Int. Cl.$^7$ .............................................. B62D 25/14
(52) U.S. Cl. .......................... 180/90; 296/70; 296/197; 74/512
(58) Field of Search ................................. 296/191, 193, 296/196, 197, 70, 72, 73, 74; 180/90; 280/777, 779; 74/512, 560

(56) References Cited

U.S. PATENT DOCUMENTS

| | | | |
|---|---|---|---|
| 3,698,260 A | | 10/1972 | Shellhause |
| 3,714,780 A | | 2/1973 | Shellhause |
| 4,126,202 A | * | 11/1978 | Hern ............................. 180/90 |
| 4,582,156 A | * | 4/1986 | Kochy et al. ................ 296/197 |
| 4,896,736 A | | 1/1990 | Smith |
| 4,978,163 A | * | 12/1990 | Savio .......................... 296/197 |
| 5,005,898 A | * | 4/1991 | Benedetto et al. ........... 296/191 |
| 5,082,078 A | * | 1/1992 | Umeda et al. ................. 296/70 |
| 5,088,571 A | | 2/1992 | Burry et al. |
| 5,167,305 A | | 12/1992 | Cadeddu |
| 5,181,435 A | * | 1/1993 | Khalifa et al. ............... 280/777 |
| 5,234,246 A | * | 8/1993 | Henigue et al. ............. 296/197 |
| 5,364,159 A | * | 11/1994 | Kelman et al. ................. 296/70 |
| 5,669,634 A | * | 9/1997 | Heinzman et al. ........... 280/777 |
| 5,707,100 A | * | 1/1998 | Suyama et al. ................ 296/70 |
| 5,911,438 A | * | 6/1999 | Anspaugh et al. ........... 280/777 |
| 6,260,914 B1 | * | 7/2001 | Nieminski et al. ........... 280/779 |

FOREIGN PATENT DOCUMENTS

| | | |
|---|---|---|
| EP | 0456531 A | 11/1991 |
| FR | 2623776 A | 6/1989 |
| FR | 2765175 A | 12/1998 |

* cited by examiner

Primary Examiner—J. J. Swann
Assistant Examiner—Christopher Bottorff
(74) Attorney, Agent, or Firm—Jeffrey P. Calfa; Neil T. Powell; Dennis Kelly Sullivan

(57) ABSTRACT

A driver control module for a vehicle and a method of assembling and installing the driver control module in the vehicle. The driver control module includes the operator control pedals, the steering column and a large portion of the brake actuation system of the vehicle. The driver control module is designed to be assembled as a unit and then mounted to the dash of the vehicle.

36 Claims, 15 Drawing Sheets

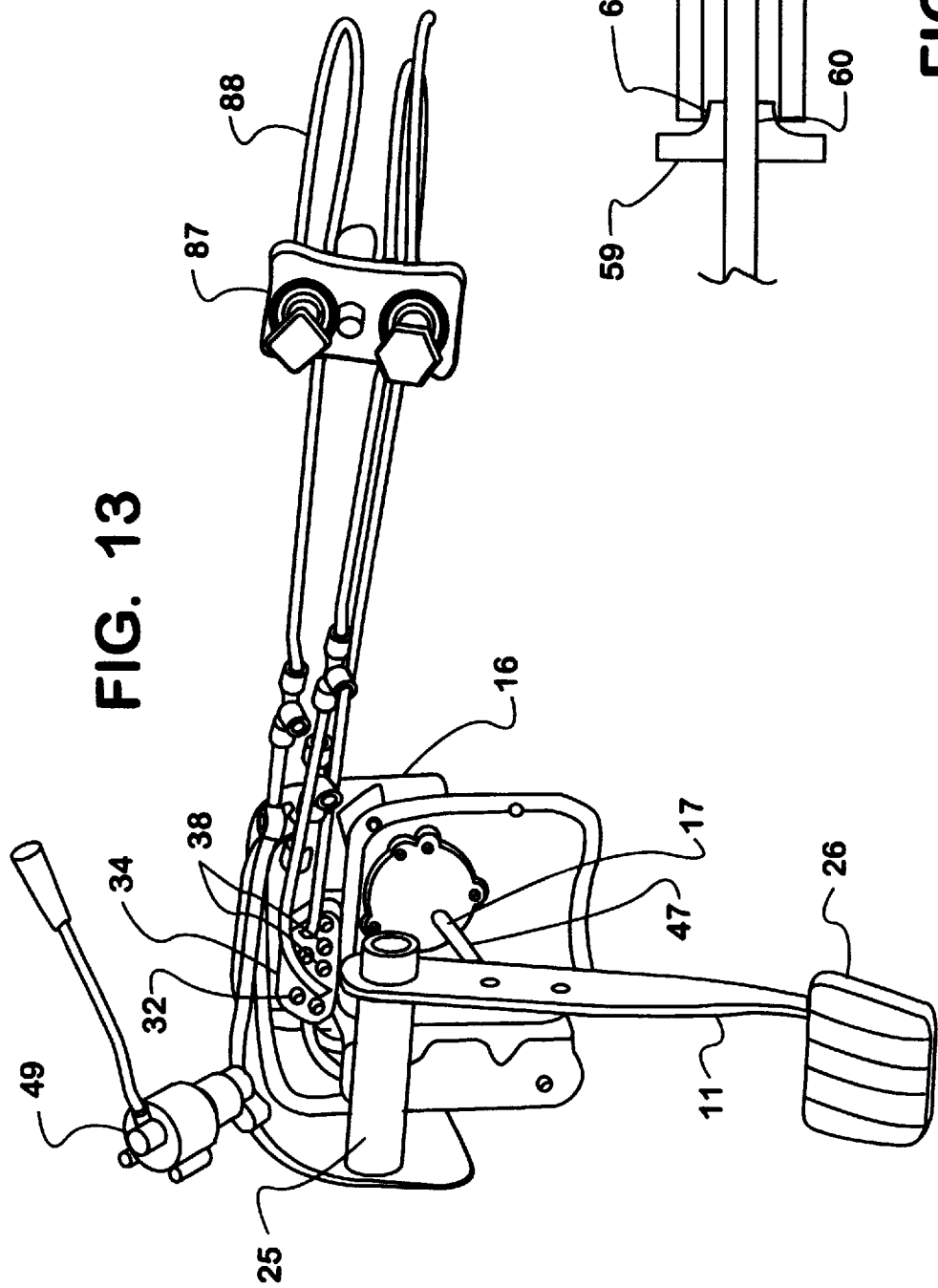
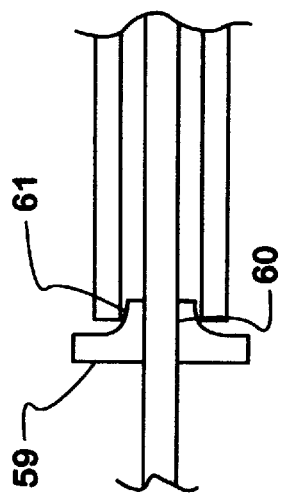

DRIVER CONTROL MODULE

This is a non-provisional application claiming priority under provisional patent application Ser. No. 60/140,910 filed Jun. 24, 1999.

BACKGROUND

This invention relates to a driver control module for a mobile vehicle such as medium or heavy duty truck, the vehicle with the driver control module installed, and the process of installing the driver control module into a vehicle. The driver control module contains the steering column, brake, clutch, and accelerator pedals, and brake valves. The module may be easily installed in openings on either the right or left sides of a symmetrical dash panel of a vehicle cab depending on whether the vehicle is right hand or left hand drive. A cab air conditioning module is installed on the opposite side opening of the driver control module thereby reducing assembly line efforts. The driver control module may be separately assembled, brought to the main assembly line as a unit and readily installed on the vehicle on the line as a unit.

PRIOR ART

In the prior art, driver control modules did not include the steering column for steering wheel mounting, the driver-operated brake, clutch, and accelerator pedals, and brake valves. Engineers needed to design separate installation for these components and assembly line workers had to separately install the components during vehicle installation. Left hand drive and right hand drive vehicles had to be separately designed. Components were not interchangeable. In Class 5 to 8 medium and heavy-duty trucks, the steering column was attached to an intermediate shaft that passed through the bulkhead to the engine area. Air lines from manually operated brake valves such as the push-pull double check valve had to be run through holes cut through the cab bulkhead. This involved considerable extra effort and labor.

SUMMARY

A primary object of the invention is to provide a driver control module which contains the steering column, the driver operated pedals, and the brake valves for the vehicle for easy installation into a dash of a cab.

The primary object of the invention as well as others not mentioned are satisfied as follows. The Driver Control Module (DCM) will have a pedestal stamping or which is engaged to an inboard side of a dash engagement piece. Inboard refers to inside of the cab of the vehicle where the driver resides during vehicle operation. The steering column, brake and clutch pedals, if manual transmission operated, and turn signal may be mounted to the pedestal stamping. The accelerator pedal may be mounted either directly to the dash engagement piece or to an auxiliary engagement piece. The mounting location for accelerator contains a hole pattern which will allow various accelerator pedal installations depending on the configuration of the cab.

The pedestal mounting will contain at least two essentially parallel and upstanding vertical mounting surfaces running along the length of the vehicle, when the DCM is installed. The mounting surfaces each contain a mounting hole for a tube within a tube brake clutch mounting arrangement. One tube is engaged to the brake pedal and will operate the vehicle brakes through either air or hydraulic valves depending on if the brakes are air or hydraulically operated. In the preferred embodiment, a clutch tube will run within the brake tube separated by a bushing to allow separate movement of the brake and clutch tubes respectively. The bushing may contain bearing surfaces on the inside and the outside to allows simultaneous independent rotation of the both the brake and clutch tubes. Which tube is within the other tube may be reversed. The tubes are mounted horizontally between and to the vertical mounting surfaces. The brake pedal is engaged to the brake tube and when depressed or released the brake tube will rotate to translate the motion to operate the respective brake valves. The brake valves are engaged to an outboard side of the dash engagement piece. Operation of the brake tube may transfer mechanical energy to operate the brake valves via plungers that transfer rotational energy to back and forth movement for actuation. Clutch pedal operation will rotate the clutch tube to operate disengage or engage the clutch of the vehicle to allow shifting.

The vertical mounting surfaces may also have a stiffening arm that will be engaged to an inner portion of the cab for support. The stiffening arm may be engaged between both mounting surfaces and to the cab when the DCM is installed. The vertical mounting surfaces may also include switch slots for cruise control reed switches. The reed switches allow the operator to disable or enable cruise control with interlocks to vehicle starting.

The dash engagement piece may be symmetrically shaped as well may be the dash panel itself. The dash panel is part of the cab frame. The holes in the dash panel may be sized on both the right and left sides to allow installation of the dash engagement piece to either side for left or right hand drive vehicles respectively. This allows both left hand and right hand drive vehicles to be manufactured on the same assembly line with little or no impact on production time.

There are parallel steering column engagement arms engaged to the vertical-mounting surfaces. The steering column is mounted to and between the column engagement arms. The steering column contains at least one engagement means on each side for engagement to each column engagement arm. The steering column is long enough to pass through the dash engagement piece. When installed, the steering column is then engaged to an intermediate steering piece that is then engaged to a steering gear. The steering column is engaged to a through wall bushing at the engagement piece. The steering column may have a turn signal module integrated to it. Additionally, for trailer pulling vehicles, the steering module may have the trailer hand control integrated. Integration into the DCM will allow installation of these components separate from the main assembly line thereby saving time. The DCM steering column may also use a clock spring to ensure continuity of electricity to the collision event initiated driver air bag.

The dash engagement piece contains passageways for the steering column and the operators of the brake valves. Additionally, there is hole for a fill-in gland that allows passage of the air tubing from the brake valves and the push-pull double check valve and other cab operated air valves. There may also be an air pass through slot for installation of a block with push-to-connect type air connectors. The connectors would be on both the inboard and outboard side of the block and hence in the cab and outside the cab.

The DCM is assembled separate from the vehicle main assembly line. The DCM is brought to the line as a unit and dropped into position in the left or right engagement location in the dash panel. The dash engagement piece may have fasteners already installed that are then bolted into place on the dash panel.

DRAWINGS

Other objects and advantages of the invention will become more apparent upon perusal of the detailed description thereof and upon inspection of the drawings in which:

FIG. 13 is a perspective view of a brake valve, a brake pedal, and brake operating components of the driver control module of the present invention.

FIG. 14 is a sectional view of the tube within a tube arrangement of the brake and clutch pedals of the driver control module of the present invention.

DETAILS OF INVENTION

Figure 1:
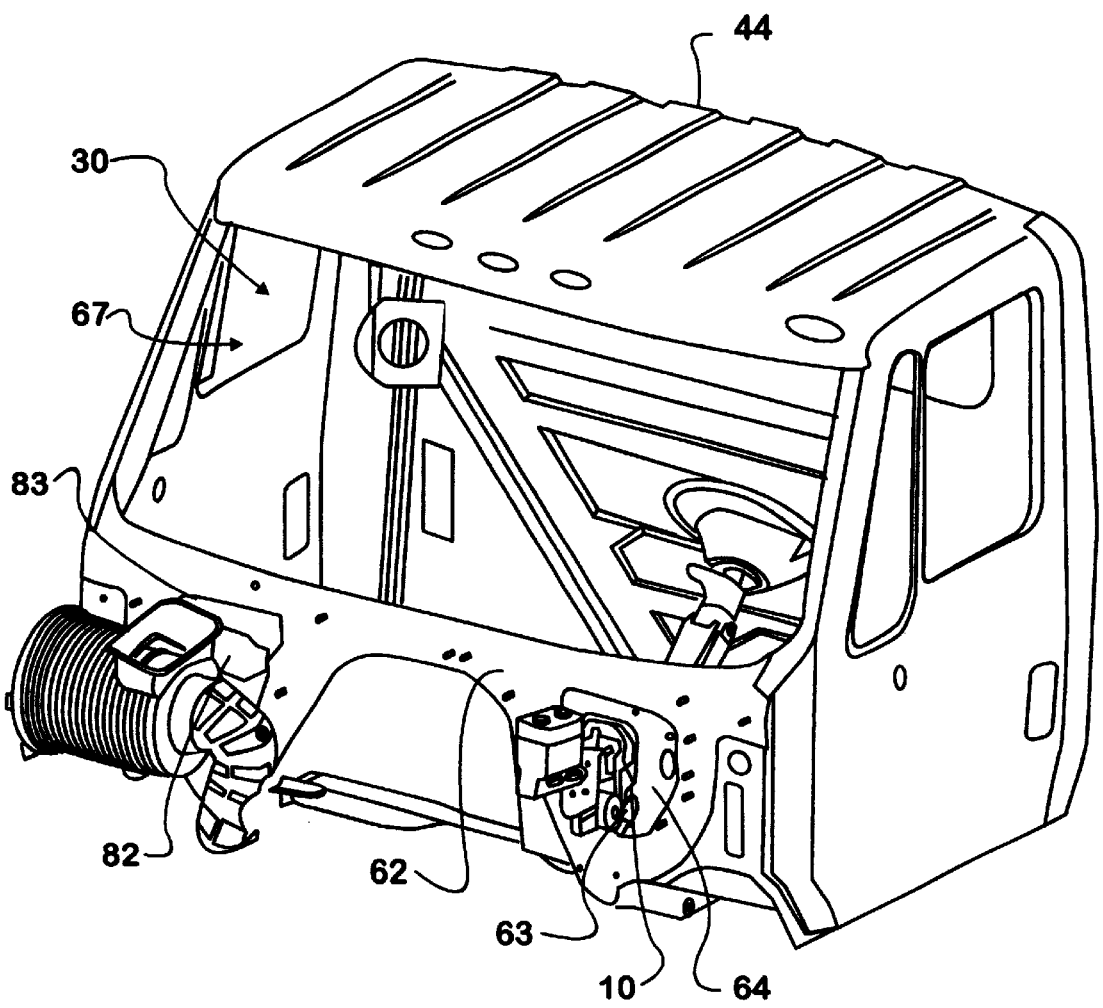
FIG. 1 is a perspective view of a cab with a driver control module of the present invention installed.
Figure 2:
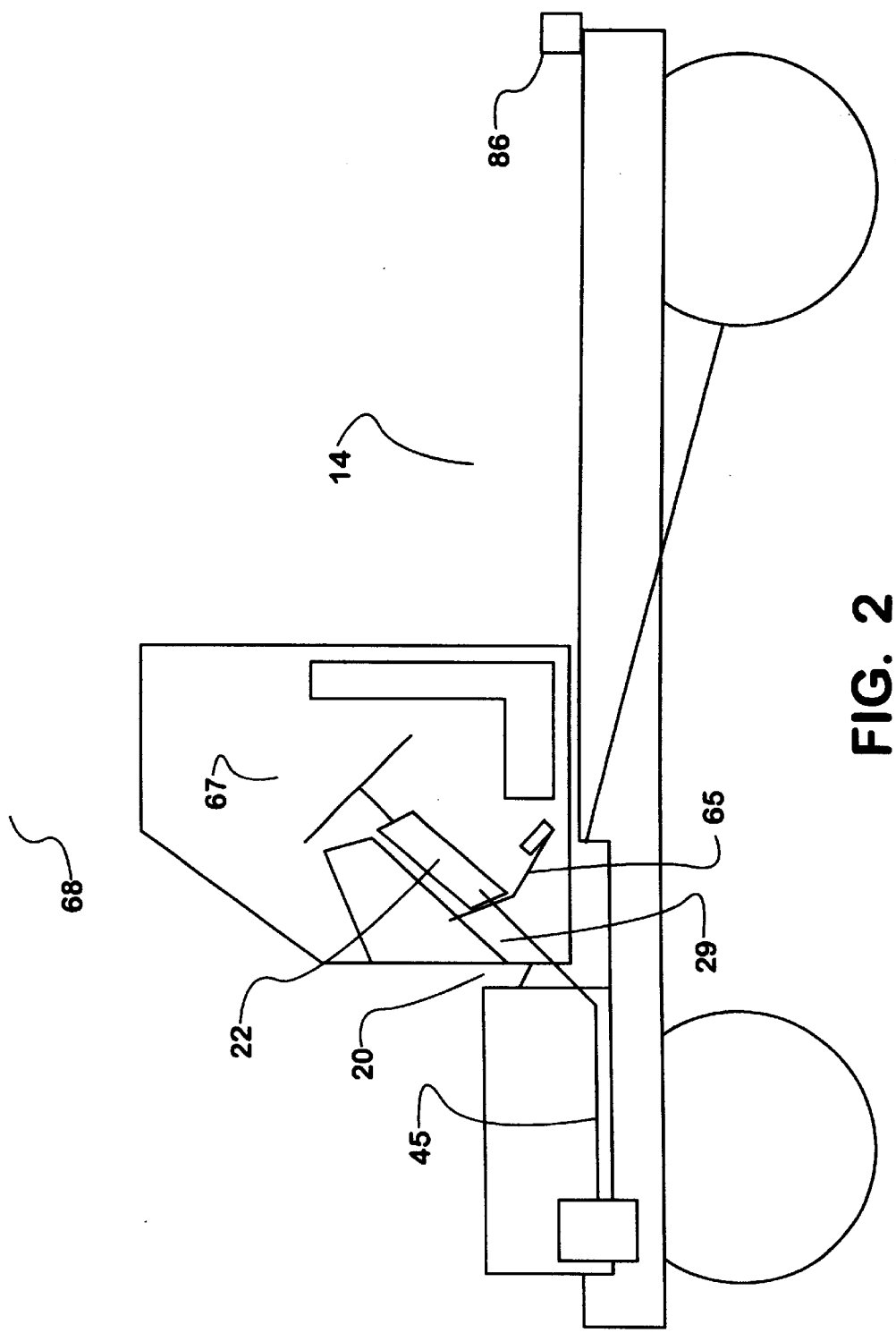
FIG. 2 is a side sectional view of a vehicle with the driver control module of the present invention installed.
Figure 3:
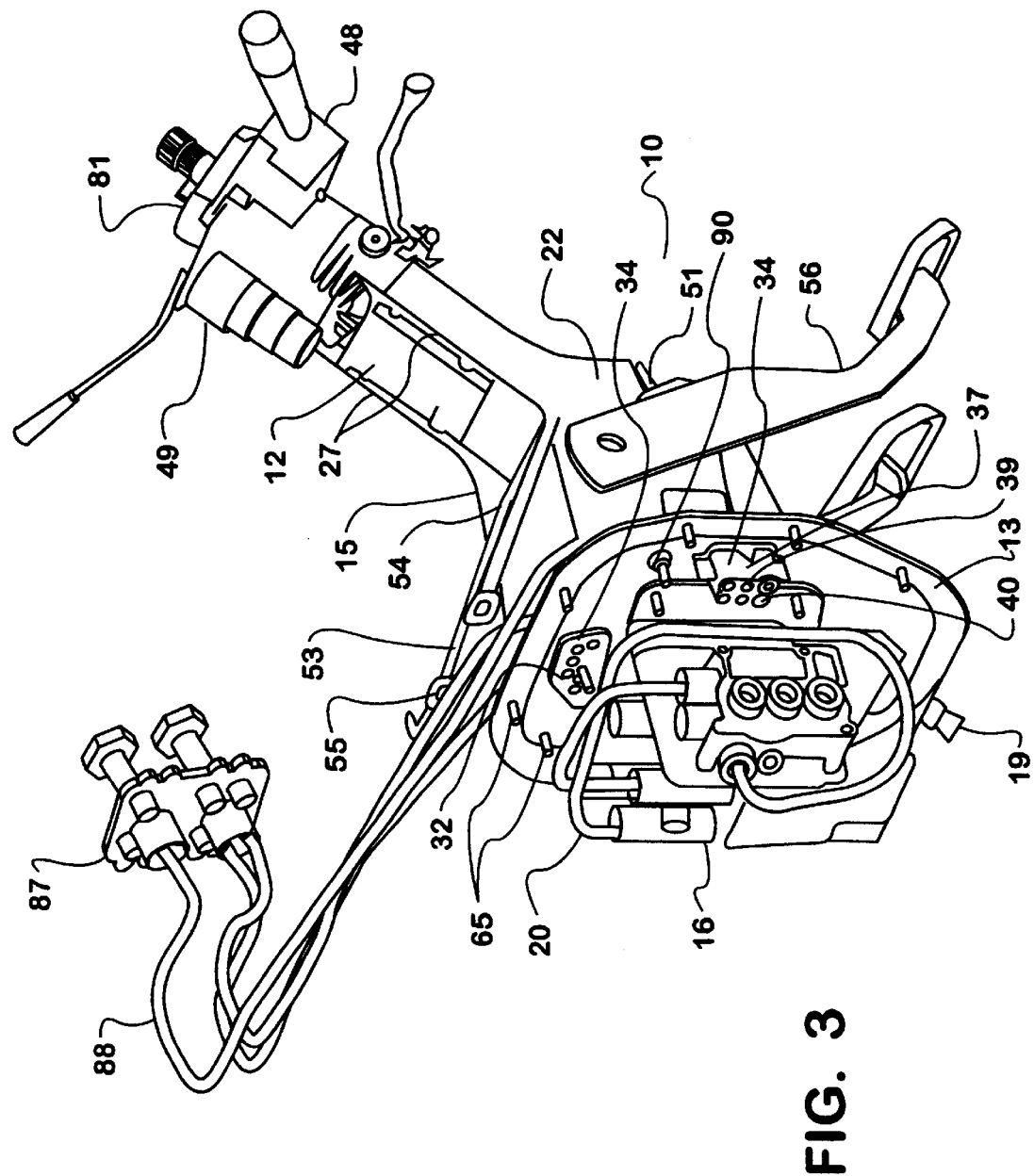
FIG. 3 is a perspective view from the outboard side of the dash engagement piece of the driver control module of the present invention showing the brake valves, the steering column assembly, and the operator pedals.
Figure 4:
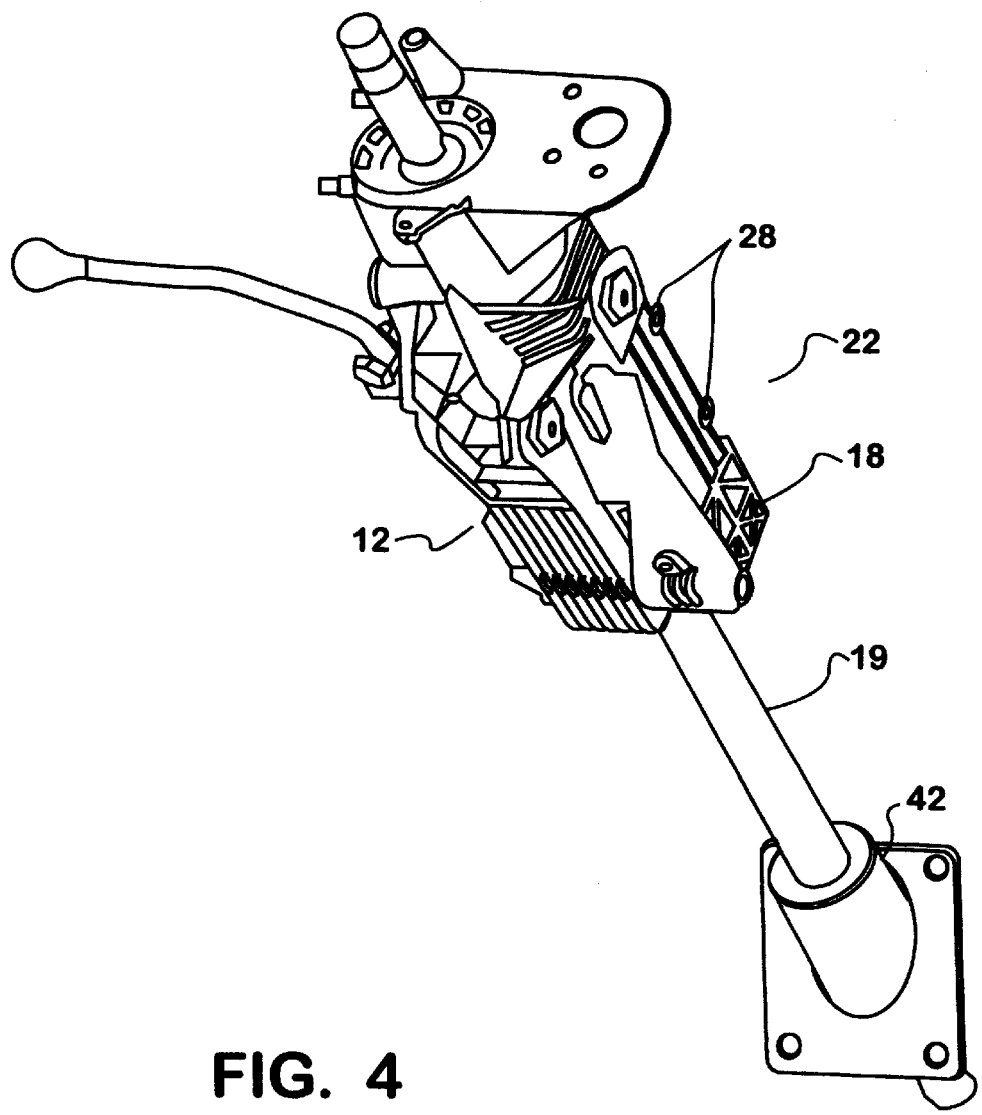
FIG. 4 is a perspective view of a steering column assembly.
Figure 5:
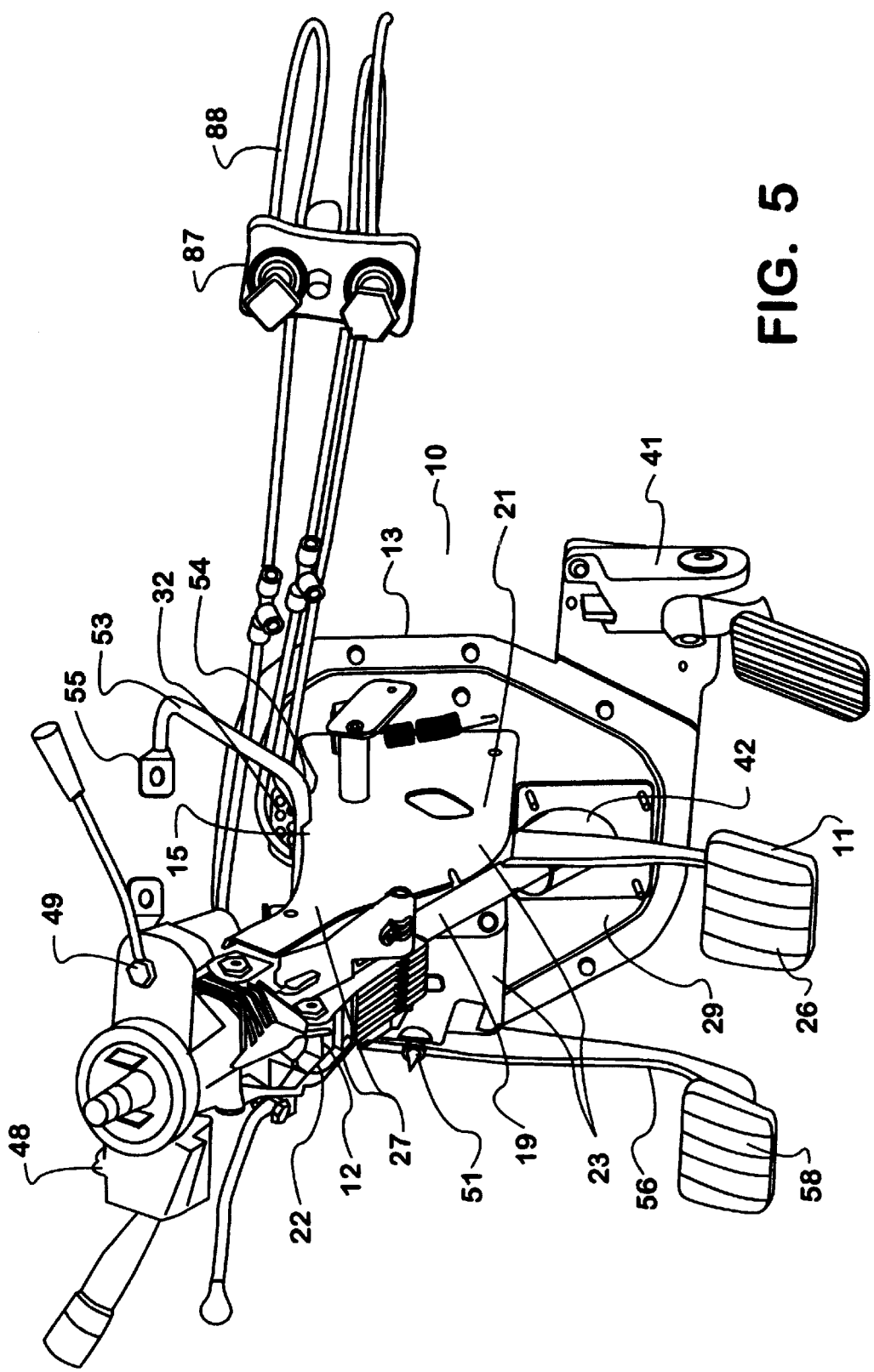
FIG. 5 is a perspective view from the inboard side of the dash engagement piece of the driver control module of the present invention showing the brake valves, the steering column assembly, and the operator pedals.
Figure 6:
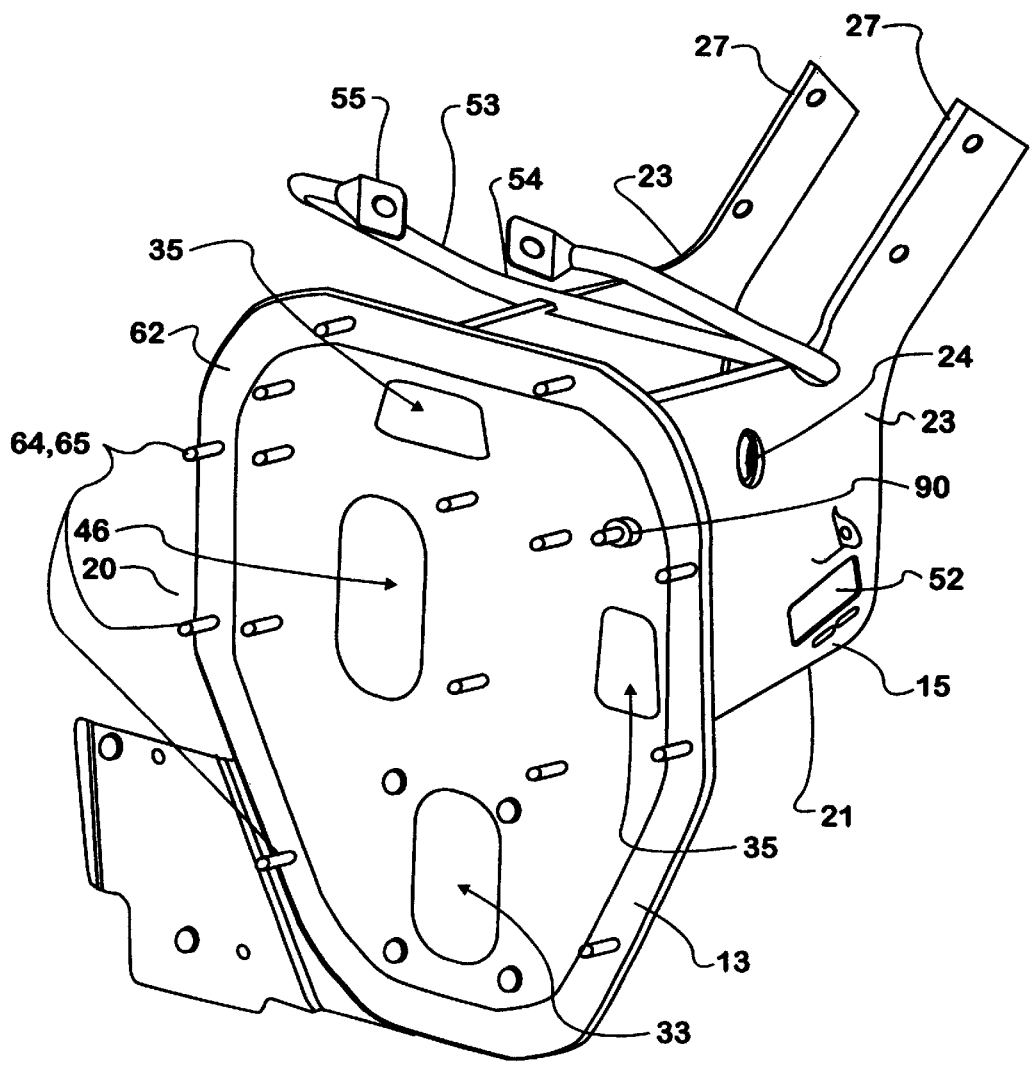
FIG. 6 is a perspective view of the dash engagement piece, the pedestal stamping, and the stiffening arm from the outboard side of the dash engagement piece.
Figure 7:
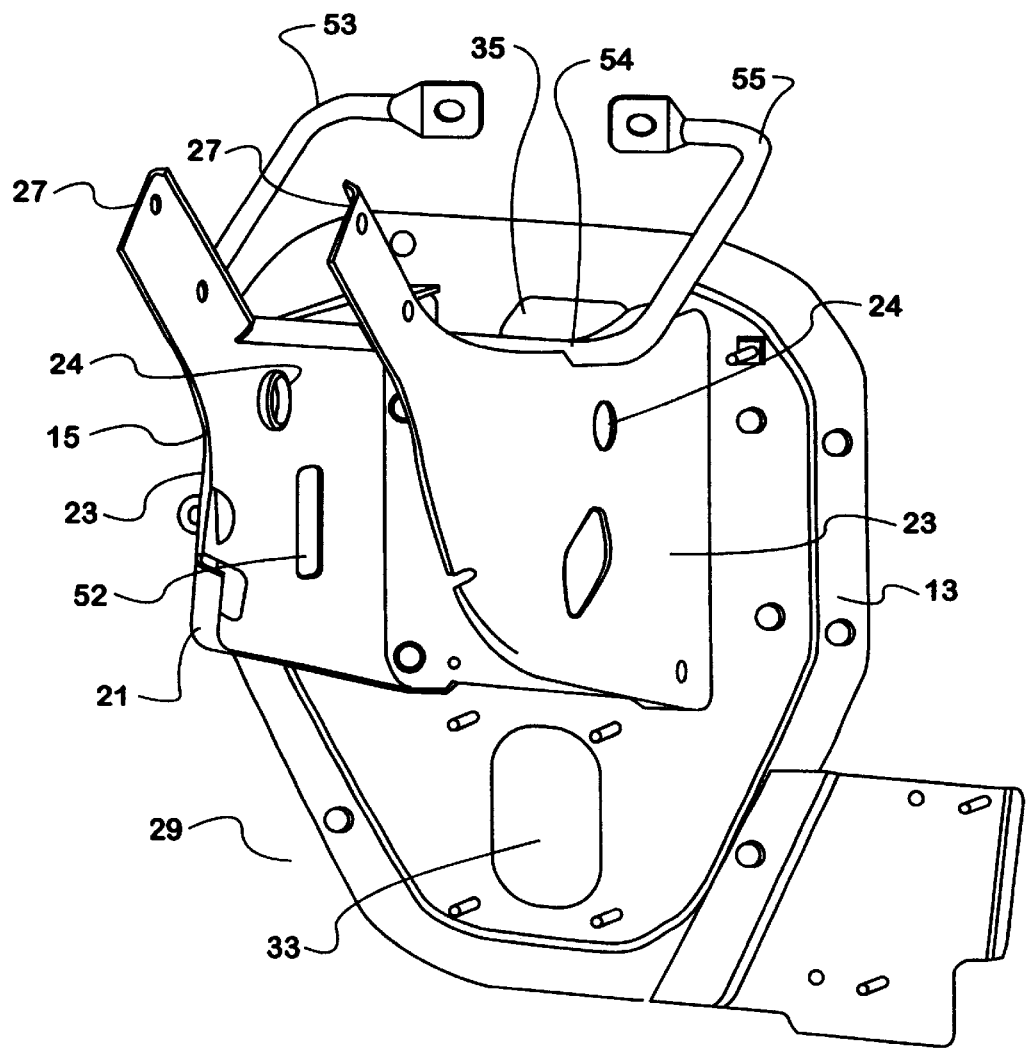
FIG. 7 is a perspective view of the dash engagement piece, the pedestal stamping, and the stiffening arm from the inboard side of the dash engagement piece.
Figure 8:
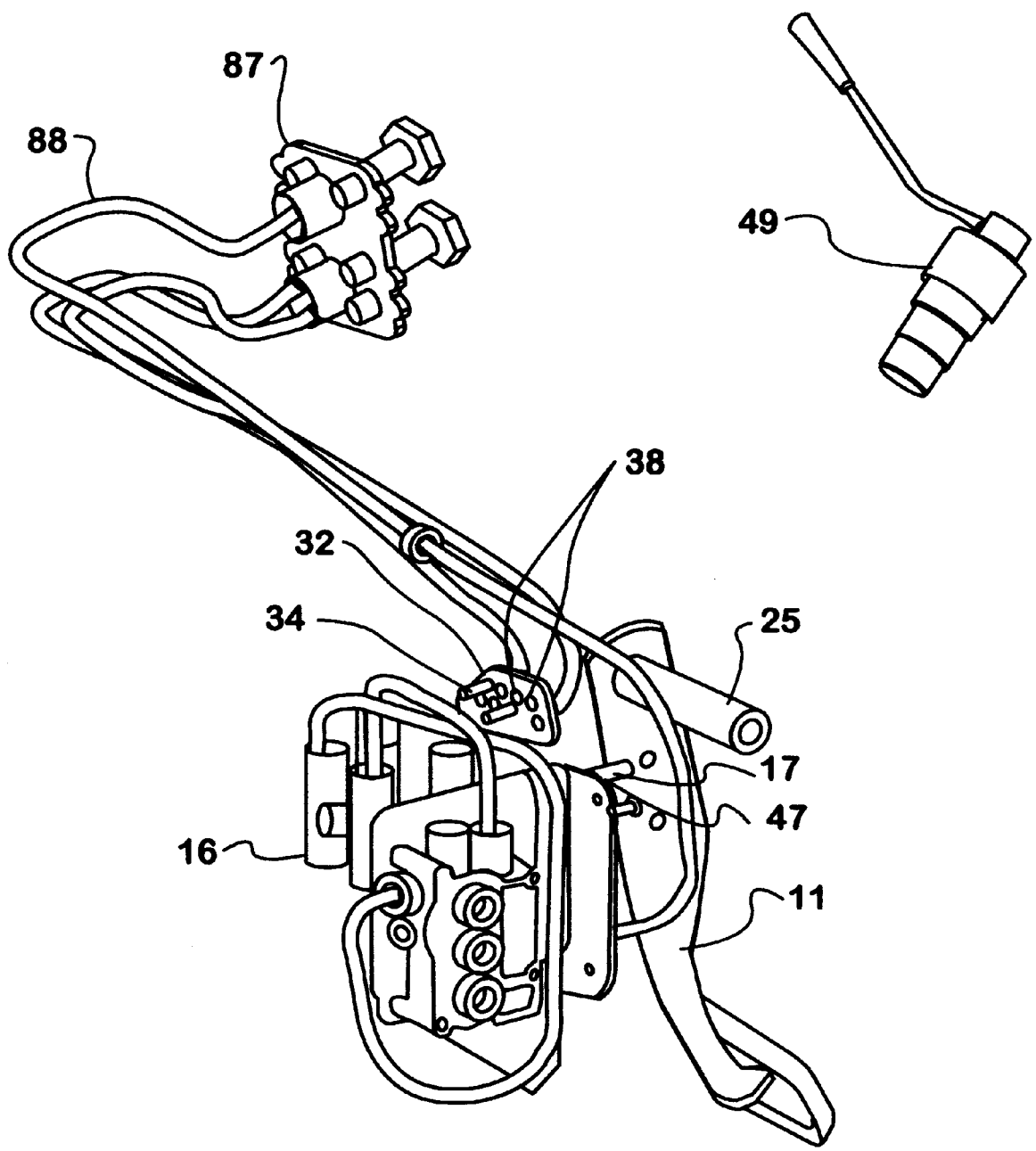
FIG. 8 is a perspective view of the brake valves, the push-pull double check valves, and the brake pedal.
Figure 9:
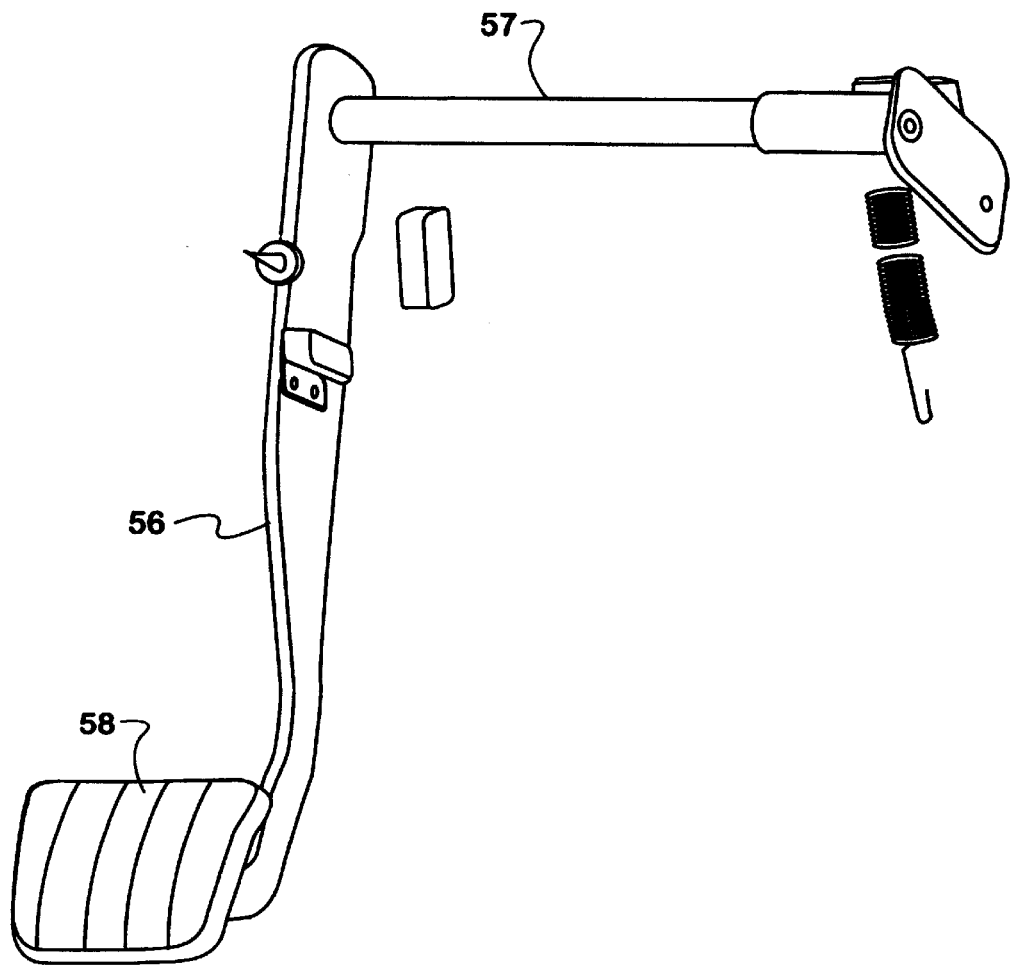
FIG. 9 is a perspective view of the clutch pedal.
Figure 10:
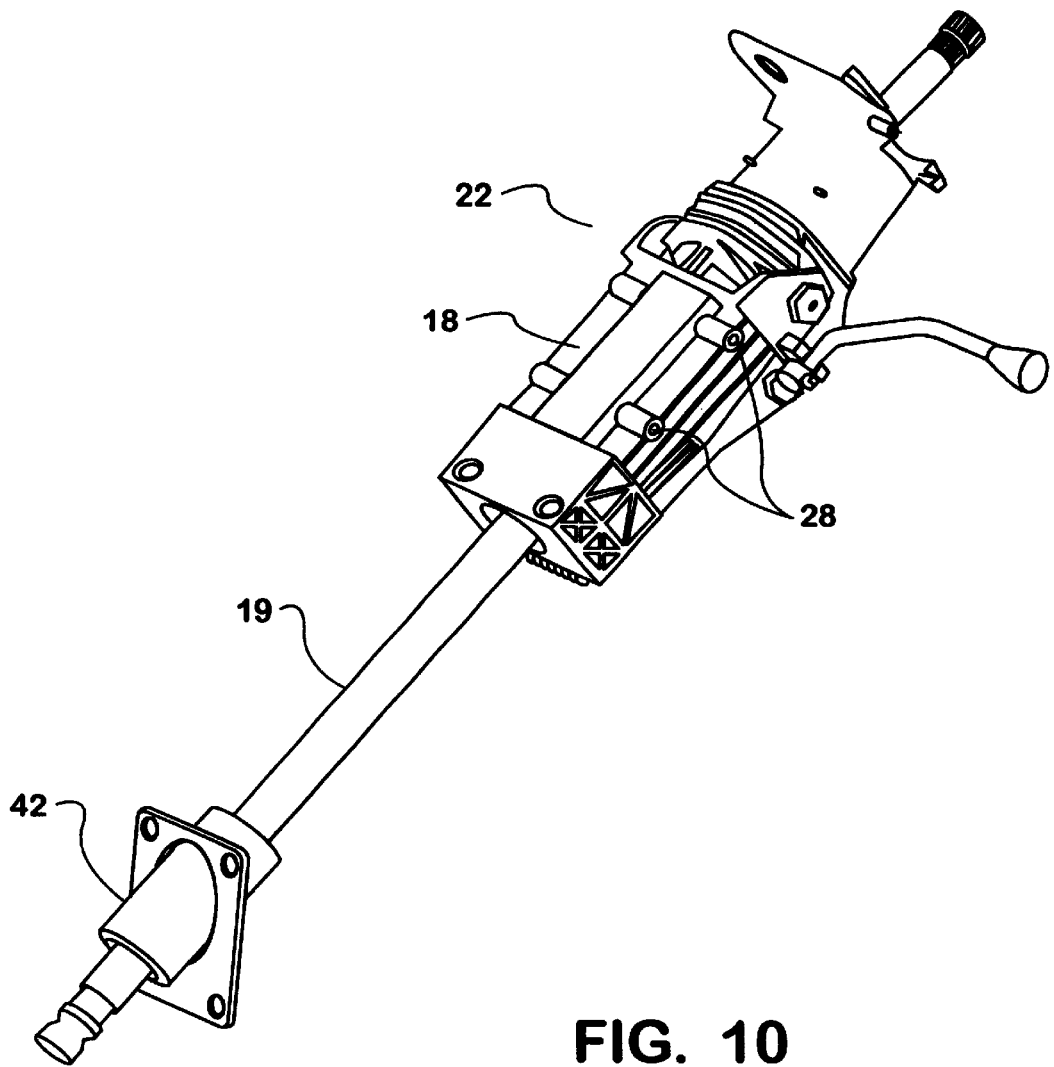
FIG. 10 is a perspective view of a steering column assembly and a through wall bushing.

There is shown in FIGS. 1–14 a driver control module 10, a vehicle 14, and various components of each according to the present invention. The driver control module 10 of the present invention allows assembly of the brake pedal 11 and one or more steering column components 12 to a first dash engagement piece 13 and the subsequent installation of the resulting assembled driver control module 10 in the vehicle 14 as a unit. The first dash engagement piece 13 is designed to be the foundation of the driver control module 10 and to be mounted to the dash panel 62 of the cab 44. The dash panel 62 defines a first driver control module opening 63 as can be best seen in FIG. 1. The first driver control module opening 63 of the dash panel 62 is of a shape such that the first dash engagement piece 13 spans the first driver control module opening 63 when the driver control module 10 is installed in the vehicle 14. The dash panel 62 and first the dash engagement piece 13 both contain engagement means 64 for engagement of the first dash engagement piece 13 to the dash panel 62. In the preferred embodiment the engagement means 64 on the first dash engagement piece 13 are comprised of a plurality of threaded fasteners 65 fixedly attached to the first dash engagement piece 13. A second driver control module opening 82 may be defined in the dash panel 62 at a position laterally opposite the first driver control module opening 63. This second driver control module opening 82 would be of substantially the same shape as the first driver control module opening 62. Engagement means are present in the dash panel 62 adjacent the second driver control module opening 82 for engaging the first dash engagement piece 13 to the dash panel 62 within the second driver control module opening 82. A vehicle cab 44 which is thus configured with a first driver control module opening 63 and a second driver control module opening 82 as specified above can easily be assembled with the driver control module 10 on either the left or right hand side of the cab 44. Thus, the present invention allows for easy adaptation of a vehicle 14 to either left or right hand drive configurations.

The vehicle of the present invention may also include an air conditioning module. The air conditioning module may include a second dash engagement piece which acts as a foundation for the air conditioning module in the same manner as the first dash engagement piece 13 acts a foundation for the driver control module 10. In the preferred embodiment the second dash engagement piece is shaped substantially the same as the first dash engagement piece 13. The second dash engagement piece and the air conditioning module can, therefore, be installed in whichever of the first driver control module opening 63 and the second driver control module opening 82 that the driver control module 10 is not mounted in. The brake pedal 11 and the one or more steering column components 12 are directly or indirectly engaged to the first dash engagement piece 13. The brake pedal 11 is fully supported by either the first dash engagement piece or intermediate structural components 15. The steering column assembly 22 is primarily supported either directly or indirectly by the first dash engagement piece 13. The driver control module 10 of the present invention may also include an accelerator pedal assembly 41 mounted directly or indirectly to the first dash engagement piece 13. The driver control module 10 may include engagement means for mounting different styles of the accelerator pedal assembly 41. The engagement means for mounting the accelerator pedal assembly may also be configured to allow mounting of the accelerator pedal assembly 41 in more than one location to accommodate different cab configurations for different vehicles. In the preferred embodiment the driver control module 10 includes a hole pattern to which more than one style of accelerator pedal assembly 41 can be mounted in more than one location.

Figure 11:
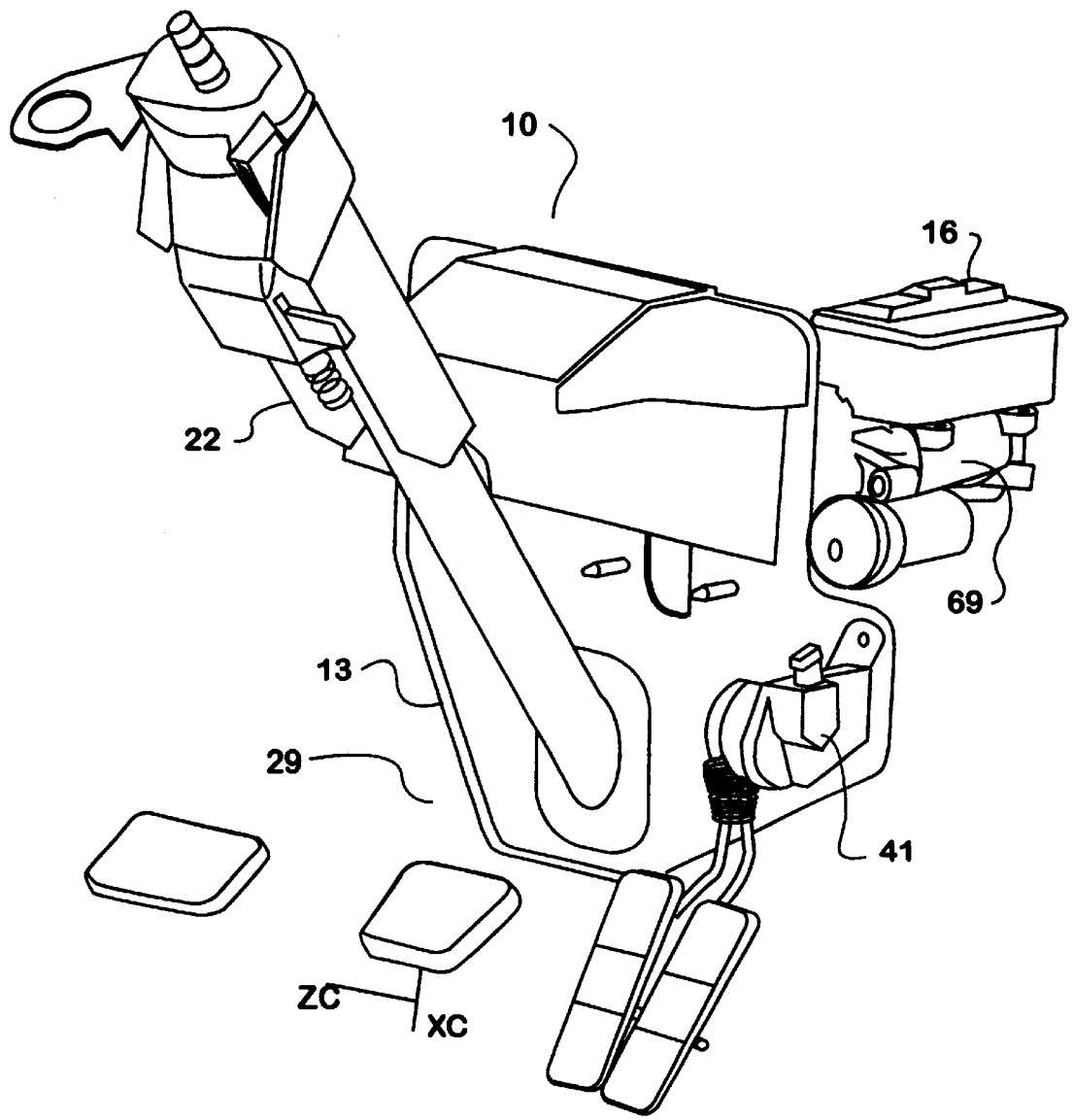
FIG. 11 is a perspective view, from the inboard side of the dash engagement piece, of a variation of the driver control module of the present invention which is for a vehicle which has hydraulically actuated brakes and does not include a pedestal stamping.
Figure 12:
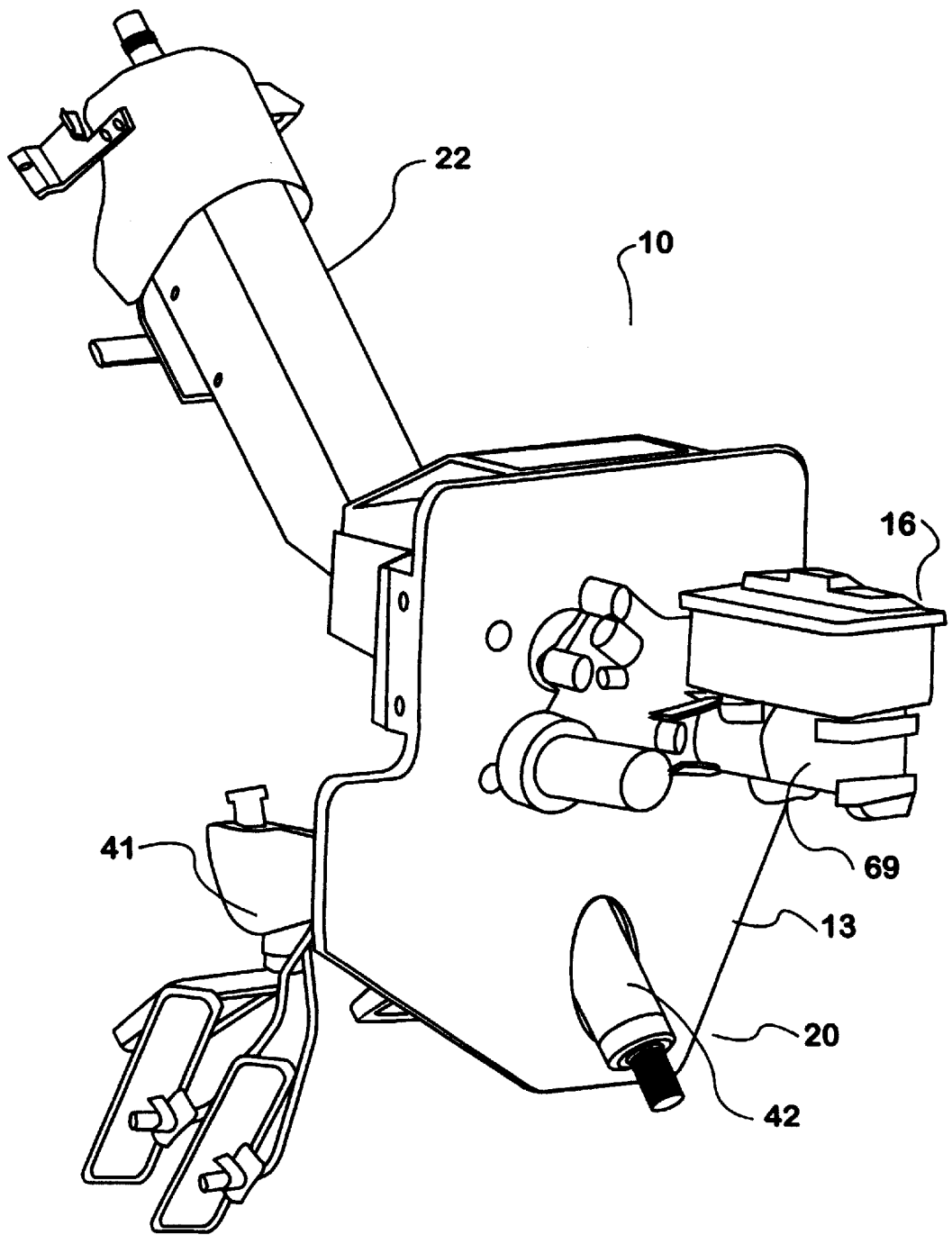
FIG. 12 is a perspective view, from the outboard side of the dash engagement piece, of a variation of the driver control module of the present invention which is for a vehicle which has hydraulically actuated brakes and does not include a pedestal stamping.

One or more brake system actuation components may also be assembled to the driver control module 10. One or more brake valves 16, which comprise a portion of the brake system actuation components, may be included in the driver control module 10. These one or more brake valves 16 may be directly or indirectly mounted to the first dash engagement piece 13. For a vehicle 14 which is equipped with hydraulically actuated brakes, the one or more brake valves 16 would be comprised of a master cylinder 69, and a brake booster. Brake system components for a vehicle 14 with hydraulically actuated brakes are shown in FIGS. 1, 11, and 12. For a vehicle 14 which is equipped with air actuated brakes, the one or more brake valves 16 may be comprised of some or all of a foot valve, a parking control valve, and a tractor protection valve all of which are well known in the art. The driver control module 10 may also include push-pull double check valves 87 which may or may not be mounted to the first dash engagement piece 13. Tubing connections 88 between the push-pull double check valves 87 and the one or more brake valves 16 of the driver control module 10 would be included with the driver control module 10. Brake system components for a vehicle 14 that has air actuated brakes are shown in FIGS. 3, 5, 8, and 13. Preferably, the driver control module 10 also includes all necessary tubing connections between any of the one or more brake valves 16 which are present on the driver control module 10. By including the tubing connections between the one or more brake valves 16 of the driver control module 10 it makes it possible to test the connections for leaks before the driver control module 10 is installed in the vehicle 14. Brake valve operating components 17 may be assembled to the driver control module 10 as well. The brake valve operating components 17 operatively connect the brake pedal 11 to one or more of the one or more brake valves 16 such that movement of the brake pedal 11 causes actuation of one or more of the one or more brake valves 16. In the preferred embodiment the one or more brake valves 16 are mounted to the outboard side 20 of the first dash engagement piece 13 and thus when the driver control module 10 is installed in the vehicle 14 the one or more brake valves 16 are located outside the cab 44. In this preferred embodiment, the first dash engagement piece 13 defines a brake valve operating component opening 46 through itself. The brake valve operating components 17 are comprised of a member 47 which protrudes through the brake valve operating component opening 46 defined by the first dash engagement piece 13.

Figure 15:
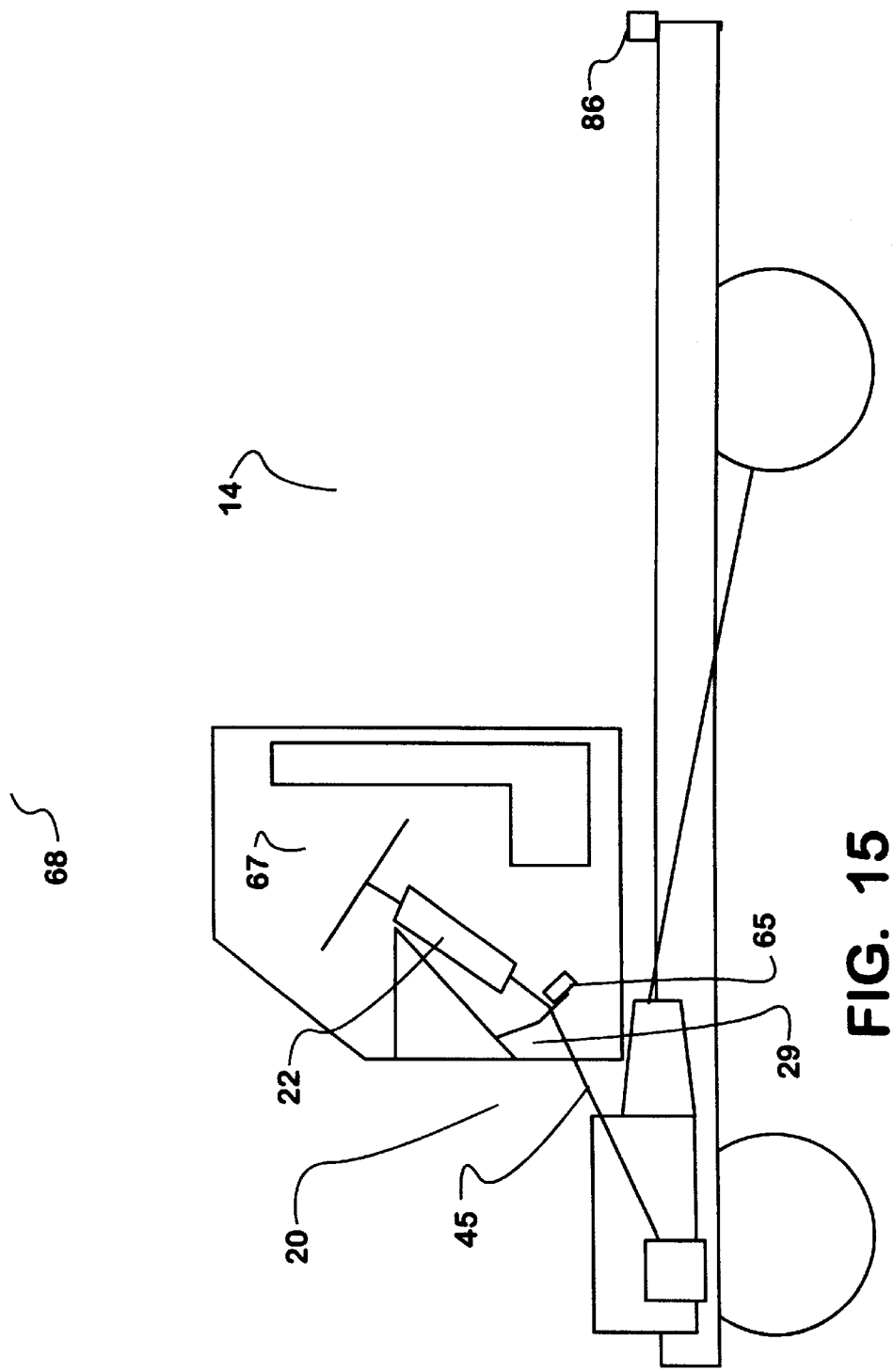
FIG. 15 is a side sectional view of a vehicle of the prior art.

The design of the one or more steering column components 12 and the way in which they are assembled to the driver control module 10 and the vehicle 14 add to the advantages of the present invention. The driver control module 10 of the present invention may have a steering column housing 18 engaged directly or indirectly to the first dash engagement piece 13. A steering column steering shaft 19, supported by said steering column housing 18, may also be part of the driver control module 10. Preferably, the first dash engagement piece 13 defines a steering column opening 33 through itself through which the steering column steering shaft 19 protrudes to the outboard side 20 of the first dash engagement piece 13. Because the steering column steering shaft 19 protrudes outside the cab 44 it is much easier to connect to the intermediate shaft 45 of the steering system than the steering column steering shaft 45 of the prior art which terminated well inside the cab 44. The relationship of the steering column steering shaft 19 to the cab 44 is best shown for the present invention in FIG. 2 and for the prior art in FIG. 15. The driver control module 10 may also include a through wall bushing 42 engaged to the first dash engagement piece 13. The through wall bushing 42 defines a central bore and when installed is positioned such that the central bore of said through wall bushing 42 is aligned with the steering column opening 33 defined by the first dash engagement piece 13. A lower portion 82 of the steering column steering shaft 19 passes through the central bore in the through wall bushing 42.

Figure 16:
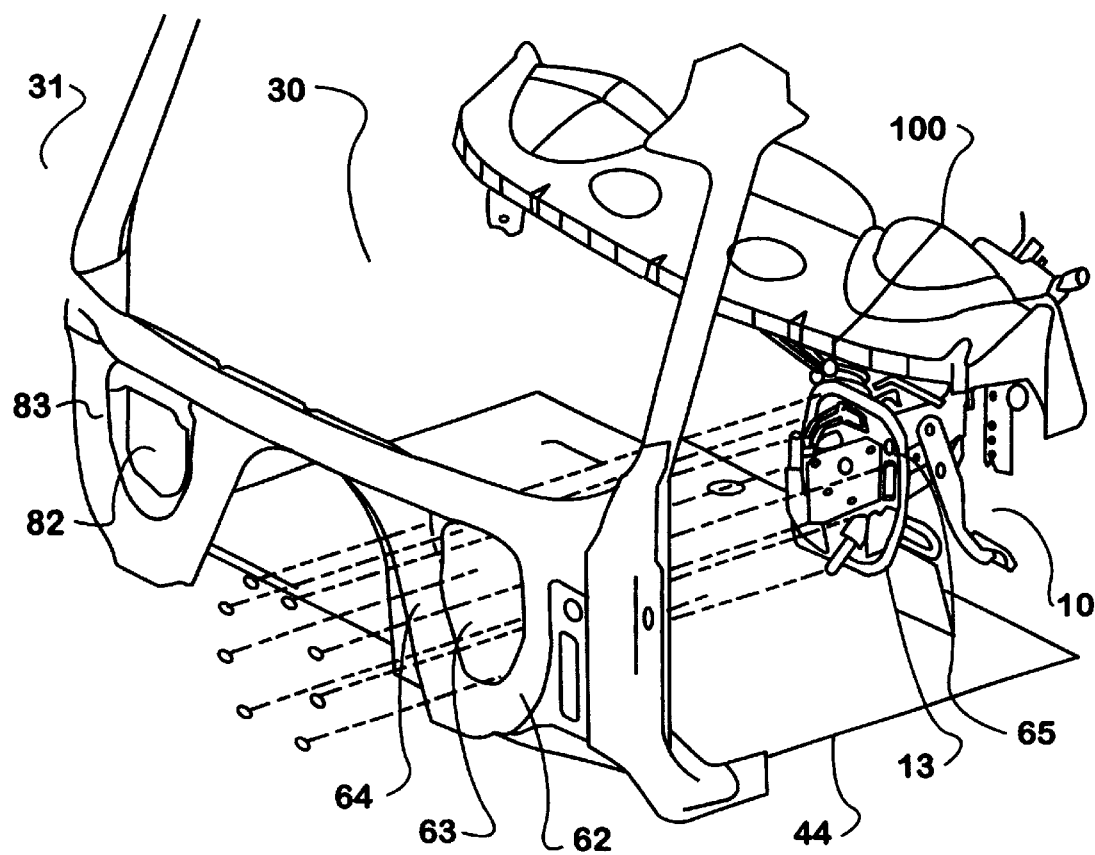
FIG. 16 is a perspective view of an instrument panel assembly engaged to a driver control module within the interior of a cab.

In one embodiment the intermediate structural components 15 which may be present between the first dash engagement piece 13 and one or more of the brake pedal 11, the steering column assembly 22, and the one or more brake valves 16 are comprised of a pedestal stamping 21. The pedestal stamping 21 may have at least two upstanding vertical mounting surfaces 23 that are substantially parallel to each other. These upstanding vertical mounting surfaces 23 are oriented such that when the driver control module 10 is mounted to the vehicle 14 the upstanding vertical mounting surfaces 23 are substantially parallel to a longitudinal axis of the vehicle 14. In the preferred embodiment, each of the upstanding vertical mounting surfaces 23 of the pedestal stamping 21 defines a mounting hole 24 for a tube. A brake pedal tube 25 may be engaged to the brake pedal 11 parallel to a foot contact surface 26 and at a point of the brake pedal 11 some distance from the foot contact surface 26 of the brake pedal 11. When the driver control module 10 is assembled the brake pedal tube 25 is disposed within each of the mounting holes 24 for a tube. The brake pedal tube 25 is thus supported perpendicularly between each of the upstanding vertical mounting surfaces 23 by each of the mounting holes 24 defined by each upstanding vertical mounting surface 23. The brake pedal 11 is thus fully supported by the pedestal stamping 21 and is free to rotate about the axis of the brake pedal tube 25 which is disposed on an axis which intersects both mounting holes 24 for a tube. The brake valve operating components 17 connect a portion of the brake pedal 11 intermediate the brake pedal tube 25 and the foot contact surface 26 to one or more components of the one or more brake valves 16. Thus, when the brake pedal 11 is rotated about the axis of the brake pedal tube 25 the brake pedal 11 drives the brake valve operating components 17. The brake valve operating components 17 in turn drive one or more components of one or more of the one or more brake valves 16 to which the brake valve operating components 17 are connected and cause actuation of the respective ones of the one or more brake valves 16. An instrument panel assembly 100 may also be engaged to the driver control module 10. An assembled driver control module 10 with an instrument panel assembly 100 engaged to it is shown in FIG. 16. The instrument panel assembly 100 may be engaged to one or more of the components, including but not limited to the first dash engagement piece 13, the pedestal stamping 21, and the steering column assembly 22, of the driver control module 10. Accommodations may be present for making it easier to connect the electrical and electromechanical components of the driver control module 10, and the electrical and electromechanical components inside the cab 44, with the electrical system of the vehicle 14. In the preferred embodiment a single wiring harness is present on the driver control module 10. All connections between electrical and electromechanical components of the driver control module 10 and the electrical system of the vehicle 14, can be made through this single wiring harness. This single wiring harness makes it much easier to make the necessary electrical connections between the electrical and electromechanical components of the driver control module 10 and the electrical system of the vehicle 14. This single wiring harness can also be connected to a testing device, which simulates the operation of the portion of the electrical system of the vehicle 14 to which the wiring harness would be connected. Means for providing delivery of electrical power from outside the cab 44 to inside the cab 44 may also be provided by the driver control module 10. One such means is a power stud 90 mounted to the first dash engagement piece 13. This power stud 90 has means on both sides of the first dash engagement piece 13 for engaging electricity conducting devices. Thus, electrical power can be delivered from outside the cab 44 to inside the cab 44, or vice versa, through the power stud 90. In the preferred embodiment, an electrical pass through opening is defined by the first dash engagement piece 13. An electricity conducting device can be routed from one side of the first dash engagement piece 13, through the electrical pass through opening, to the other side of the first dash engagement piece 13. Thus, electrical power can be delivered from outside the cab 44 to inside the cab 44, or vice versa, through the electricity conducting device which is routed through the electrical pass through opening defined in the first dash engagement piece 13.

For vehicles which have manual transmissions the driver control module 10 may further include a clutch pedal 56. The clutch pedal 56 is mounted directly or indirectly to the first dash engagement piece 13 and derives its support from either directly or indirectly from the first dash engagement piece 13. The clutch pedal 56 may be engaged the driver control module in any manner which allows proper functioning of the clutch pedal 56. In the preferred embodiment the clutch pedal 56 and the brake pedal 11 are engaged to the driver control module 10 in a tube within a tube arrangement. A clutch pedal tube 57 is engaged to the clutch pedal 56 at a point of the clutch pedal 56 some distance from a clutch pedal foot contact surface 58 and parallel to the clutch pedal foot contact surface 58. In the preferred embodiment one of the clutch pedal tube 57 and the brake pedal tube 25 is disposed within the other in a tube within a tube arrangement. The driver control module 10 can be designed to have either of the brake pedal tube 25 and the clutch pedal tube 57 inside the other. The driver control module 10 may also include a pedal assembly bushing 59. The pedal assembly bushing 59 defines through itself a substantially cylindrical inner bore 60. The pedal assembly bushing 59 also has a substantially cylindrical outer surface 61, which is concentric to the inner bore 60 of the pedal assembly bushing 59. In the assembled state, the inner one of the clutch pedal tube 57 and the brake pedal tube 25 is disposed within the inner bore 60 of the pedal assembly bushing 59. The substantially cylindrical outer surface 61 of the pedal assembly bushing 59 is disposed within an inner bore of whichever of the clutch pedal tube 57 and the brake pedal tube 25 is disposed outside the other. The clutch pedal tube 57 and the brake pedal tube 25 are thus substantially free to rotate with respect to each other and about the axis defined by the two mounting holes 24 for a tube which are defined in the upstanding vertical mounting surfaces 23.

The driver control module 10 may have alternative means for mounting the operator control pedals so that the position of the operator control pedals in their free state can be adjusted. Operator control pedals which have an adjustable free position and mounting structures which may be used to directly or indirectly engage the operator control pedals to the dash engagement piece 13 are disclosed in U.S. Pat. Nos. 5,964,125, 5,697,260, and 6,070,489 which are assigned to Teleflex Incorporated and which are herein incorporated by reference. The mounting of operator pedals which have an adjustable free position allows the operator of the vehicle to position the pedals at a point which is more ergonomically suitable to him or her.

In the preferred embodiment, the pedestal stamping 21 also indirectly supports the steering column assembly 22.

Steering column engagement arms 27 are engaged to the upstanding vertical mounting surfaces 23 of the pedestal stamping 21. The steering column assembly 22 has engagement means 28 for engaging the steering column engagement arms 27. In this preferred embodiment, when the driver control module 10 is assembled the steering column assembly 22 is engaged between and primarily supported by the steering column engagement arms 27. Also in the preferred embodiment, the engagement means 28 of the steering column assembly 22 are integral to a steering column housing 18 which comprises a portion of the steering column assembly 22.

The driver control module 10 may include further support for the steering column engagement arms 27. A stiffening arm 53 may be mounted at a first end 54 to one or both of the steering column engagement arms 27. The stiffening arm 53 could be engaged at a second end 55 to an inner portion of the cab 44 when the driver control module 10 is installed in the vehicle 14. With the stiffening arm 53 thus installed, the steering column engagement arms 27 derive support from the cab 44 through the stiffening arm 53 as well as from the upstanding vertical mounting surfaces 23.

The driver control module 10 of the present invention can also be configured to accommodate the assembly of tubing passageways from inside the cab 44 to outside the cab 44. Thus, the driver control module 10 provides for communication of pressurized fluids from the inside of the cab 44 to the outside of the cab 44. The first dash engagement piece 13 may define through itself one or more tubing routing openings 35. One or more tubing routing devices 34 may be mounted within said tubing routing openings 35. These one or more tubing routing devices 34 may be comprised of one or more fill in glands 32 and/or one or more blocks of push-to-connect fittings 37. The one or more fill in glands 32 are parts which have one or more tubing routing channels 38 through which tubing can pass from one side of the fill in gland 32 through to the other side of the fill in gland 32. The fill in glands 32 also have accommodations for being mounted to the first dash engagement piece 13. The one or more blocks of push-to-connect fittings 37 are parts which have one or more push-to-connect tubing connection points 40 on each of two sides of the blocks of push-to-connect fittings 37. When the blocks of push-to-connect fittings 37 are installed in the first dash engagement piece 13 one or more push to connect tubing connection points 40 are disposed on both the inboard side 29 and the outboard side 20 of the first dash engagement piece 13. Each push-to-connect tubing connection point 40 is or can be placed in fluid communication with one or more push-to-connect tubing connection points 40 on the other side of the respective block of push-to-connect fittings 37. Each of the one or more blocks of push-to-connect fittings 39 also has accommodations for being mounted to the first dash engagement piece 13.

The driver control module 10 of the present invention may have other miscellaneous devices mounted to it. A turn signal module 48 may be engaged to the steering column assembly 22. A trailer brake hand control 49 may also be engaged to the driver control module 10. The driver control module 10 may also have provisions for mounting switches. The upstanding vertical mounting surfaces 23 may define one or more switch slots 52 in which one or more switches 51 may be engaged. The one or more switches 51 of the driver control module 10 would be connectable to the electrical system of the vehicle 14. The one or more switches 51 would be engaged to the upstanding vertical mounting surfaces 23 such that the operational state of the switches is dependent upon the position of the brake pedal 11 and/or the clutch pedal 56. The one or more switches 51 may be arranged such that when the brake pedal 11 and/or the clutch pedal 56 are operated they physically contact and cause a change of operational state of the one or more switches 51. In the preferred embodiment the one or more switches 51 are of the magnetic type which generate a magnetic field and change operational state when a magnitude of flux of the magnetic field is effected by the presence of an object comprised of ferrous metal within the magnetic field. In this preferred embodiment the one or more switches 51 are engaged to the driver control module 10 such that they are not physically contact by the brake pedal 11 or the clutch pedal 56. The one or more magnetic switches 51 would change operational state dependent upon the proximity of the brake pedal 11 and/or the clutch pedal 56. The one or more switches 51 may be connected within the electrical system of the vehicle 14 such that operation of the brake pedal 11 causes illumination of the brake lights 86 of the vehicle 14. The one or more switches 51 may also be connected within the electrical system of the vehicle 14 such that operation of the brake pedal 11 and/or the clutch pedal 56 causes termination of a cruise control mode of operation of the vehicle 14. The one or more switches 51 of the driver control module 10 may also be part of a starter interlock circuit of the vehicle 14 and thus allow operation of an engine starter of the vehicle 14 only when the clutch pedal 56 is depressed. A clock spring 81 may also be engaged to the steering column assembly 22. The clock spring 81 is enlisted to ensure continuity of electricity to the collision event initiated airbag.

The present invention also includes a method of assembling the driver control module 10 and installing the driver control module 10 in the vehicle 44. According to the method of the present invention, all of the components of the driver control module 10 are assembled into a single unit before any of the components are assembled to the rest of the vehicle 14. The components of the driver control module 10 which are assembled together as a single unit in this first step, include but are not limited to, at least some of the components of the steering column assembly 22, one or more brake valves 16, and one or more operator control pedals. The instrument panel assembly 100 of the vehicle 14 may also be engaged to the driver control module 10 of the present invention before either is installed in the vehicle 14. It is preferred the driver control module 10 be tested for proper operation before delivering it to the final assembly line where it will be installed in the vehicle 14. In order to do this all tubing connections of the driver control module 10 are pressurized and checked for leaks. It is preferable during this testing to test all electrical and electromechanical components of the driver control module 10. The electrical and electromechanical components would be electrically connected to a testing device and tested for proper operation. In the preferred embodiment of the invention the single wiring harness of the driver control module is connected to the test station and all of the electrical and electromechanical components of the driver control module are tested for proper operation. The general operation of the pedals, switches and valves of the driver control module 10, is also checked before the assembly is installed in the vehicle. Once the driver control module 10 is completely assembled it is moved into the interior 67 of the cab 44 and held in the approximate position within the cab 44 which it is designed to be in when the vehicle 14 is fully assembled. Finally, the driver control module 10 is engaged to the cab 44 such that the driver control module 10 is fully supported by the cab 44.

In the instance where the instrument panel assembly 100 has been engaged to the driver control module 10, essentially the same process is followed for installing the combination of the instrument panel assembly 100 and the driver control module 10 in the vehicle 14. The preferred method of moving the driver control module 10 into the cab 44 and holding it in position until it is finally engaged to the cab 44 is with an articulated mechanical arm.

Those skilled in the art will appreciate that modifications could be made to the invention as described without departing from the spirit and scope of the invention and thus the scope of the invention is intended to be limited only by the following claims.

We claim:

1. A driver control module for mounting as an assembled unit within a first driver control module opening in a dash panel of a cab of a vehicle which has a longitudinal axis, brake lights, a starter interlock circuit, tubing inside the cab and tubing outside the cab, comprising:

(a) a first dash engagement piece;

(b) wherein said first dash engagement piece is shaped to span the first driver control module opening in the dash panel of the vehicle;

(c) wherein said first dash engagement piece has engagement means for engaging said first dash engagement piece to the dash panel of the vehicle, (d) a brake pedal mounted directly or indirectly to said first dash engagement piece in a manner such that said brake pedal is fully supported directly or indirectly by said first dash engagement piece;

(e) one or more steering column components mounted directly or indirectly to said first dash engagement piece in a manner such that a steering column assembly is primarily supported directly or indirectly by said first dash engagement piece when said driver control module is assembled;

(f) one or more brake valves mounted directly or indirectly to said first dash engagement piece;

(g) brake valve operating components which operatively connect said brake pedal to one or more of said one or more brake valves so that movement of said brake pedal causes actuation of said one or more of said one or more brake valves;

(h) wherein said one or more steering column components include a steering column housing which supports a steering column steering shaft;

(i) wherein said first dash engagement piece defines a steering column opening through itself;

(j) wherein said steering column steering shaft extends through said steering column opening defined in said first dash engagement piece such that when said driver control module is assembled in the vehicle said steering column steering shaft extends beyond said first dash engagement piece to an outboard side of said first dash engagement piece;

(k) a pedestal stamping mounted to said first dash engagement piece;

(l) wherein at least one of said brake pedal, said steering column assembly, and said one or more brake valves directly or indirectly derive support from said pedestal stamping;

(m) wherein said pedestal stamping has at least two upstanding vertical mounting surfaces which are essentially parallel and are oriented such that, when said driver control module is installed within the vehicle, said upstanding vertical mounting surfaces are substantially parallel to the longitudinal axis of the vehicle;
- (n) each of said at least two upstanding vertical mounting surfaces defines a mounting hole for a tube;
- (o) a brake pedal tube is engaged to said brake pedal at a point of said brake pedal some distance from a foot contact surface of said brake pedal and is oriented with an axis of said brake pedal tube parallel to said foot contact surface of said brake pedal;
- (p) wherein when said driver control module is assembled said brake pedal tube is located within said mounting holes defined by said upstanding vertical mounting surfaces and is thus supported perpendicularly between said upstanding vertical mounting surfaces with said axis of said brake pedal tube substantially coincident with an axis which intersects each of said mounting holes;
- (q) wherein said brake pedal is free to rotate about said axis of said brake pedal tube and therefore also about said axis which intersects each of said mounting holes defined by said upstanding vertical supports;
- (r) wherein said brake valve operating components connect said brake pedal and one or more of said one or more brake valves;
- (s) wherein when said brake pedal is rotated about said axis of said brake pedal tube said brake valve operating components are driven by said brake pedal and in turn drive one or more components of said one or more of said one or more brake valves and thus cause actuation of respective ones of said one or more brake valves;
- (t) steering column engagement arms which are engaged to said upstanding vertical mounting surfaces and which are oriented substantially parallel to one another,
- (u) wherein said steering column assembly has engagement means for engaging said steering column assembly to said steering column engagement arms; and
- (v) wherein said steering column assembly is engaged to said steering column engagement arms and said steering column assembly is primarily supported by said steering column engagement arms.

2. The driver control module of claim 1, wherein:
- (a) said first dash engagement piece defines through itself one or more tubing routing openings.

3. The driver control module of claim 2, further comprising:
- (a) an accelerator pedal assembly mounted directly or indirectly to said first dash engagement piece.

4. The driver control module of claim 3, further comprising:
- (a) a through wall bushing which defines a central bore through itself is engaged to said first dash engagement piece and disposed such that said central bore of said through wall bushing is substantially aligned with said steering column opening defined by said dash piece; and
- (b) wherein said steering column steering shaft passes through said central bore of said through wall bushing.

5. The driver control module of claim 4, wherein:
- (a) said one or more brake valves are mounted on an outboard side of said first dash engagement piece such that when said driver control module is assembled to the vehicle said one or more brake valves are located outside the cab;
- (b) said first dash engagement piece defines a brake valve operating component opening through itself; and
- (c) said brake valve operating components are comprised of a member which protrudes through said brake valve operating component opening defined by said first dash engagement piece.

6. The driver control module of claim 5, further comprising
- (a) a single wiring harness which when connected to a mating wiring harness of the vehicle, provides all electrical connections needed for all electrical and electromechanical components of said driver control module.

7. The driver control module of claim 6, further comprising:
- (a) means for providing delivery of electrical power from outside the cab to inside the cab selected from the group consisting of a power stud and an electrical pass through opening defined in said first dash engagement piece.

8. The driver control module of claim 6, further comprising:
- (a) a turn signal module engaged to said steering column assembly.

9. The driver control module of claim 8, wherein:
- (a) said steering column engagement means for engaging said steering column assembly to said steering column engagement arms are integral to said steering column housing which comprises a portion of said steering column assembly.

10. The driver control module of claim 9, further comprising:
- (a) one or more tubing routing devices for accommodating the assembly of tubing passageways from inside the cab to outside the cab;
- (b) wherein said one or more tubing routing devices includes one or more tubing routing devices selected from the group consisting of fill in glands and blocks of push-to-connect type tubing fittings; and
- (c) wherein said one or more tubing routing devices are mounted within said one or more tubing routing openings defined in said first dash engagement piece.

11. The driver control module of claim 10, wherein:
- (a) said upstanding vertical mounting surfaces define one or more switch slots for mounting switches to;
- (b) one or more switches are mounted in said switch slots;
- (c) said one or more switches cause illumination of the brake lights of the vehicle when said brake pedal is operated;
- (d) said one or more switches operate to terminate a cruise control mode of operation of the vehicle when said brake pedal and/or said clutch pedal are operated; and
- (e) said one or more switches are part of the starter interlock circuit of the vehicle.

12. The driver control module of claim 11, further comprising:
- (a) a clutch pedal which has a clutch pedal tube engaged to said clutch;
- (b) wherein said clutch pedal tube is located parallel to a clutch pedal foot contact surface at a point some distance from said clutch pedal foot contact surface;
- (c) wherein, when said driver control module is assembled, one of said clutch pedal tube and said brake pedal tube are disposed within the other in a tube inside a tube arrangement;
- (d) a pedal assembly bushing which defines through itself a substantially cylindrical inner bore and has a substantially cylindrical outer surface which is concentric to said inner bore;

(e) wherein an inner one of said clutch pedal tube and said brake pedal tube is disposed within said inner bore of said pedal assembly bushing;

(f) wherein said substantially cylindrical outer surface of said pedal assembly bushing is disposed within an inner bore of an outer one of said clutch pedal tube and said brake pedal tube when said driver control module is assembled; and (g) whereby said tube inside a tube arrangement of said brake pedal tube and said clutch pedal tube with said pedal assembly bushing installed, allows for substantially free rotation of said clutch pedal tube and said brake pedal tube relative to each other.

13. The driver control module of claim 12, wherein:

(a) said engagement means for engaging said first dash engagement piece to the dash panel is comprised of a plurality of threaded fasteners fixedly attached to said first dash engagement piece.

14. The driver control module of claim 13, wherein:

(a) engagement means for mounting different styles of said accelerator pedal assembly and mounting said accelerator pedal assembly in more than one location.

15. The driver control module of claim 14, further comprising:

(a) a clock spring engaged to said steering column assembly for ensuring continuity of electricity to a collision event initiated driver air bag of the vehicle.

16. The driver control module of claim 15, further comprising:

(a) a trailer brake hand control mounted to either said steering column assembly or one or both of said upstanding vertical mounting surfaces.

17. A driver control module for mounting as an assembled unit within a first driver control module opening in a dash panel of a cab of a vehicle, said driver control module comprising:

(a) a first dash engagement piece;

(b) wherein said first dash engagement piece is shaped to span the first driver control module opening in the dash panel of the vehicle;

(c) wherein said first dash engagement piece has engagement means for engaging said first dash engagement piece to the dash panel of the vehicle;

(d) a brake pedal mounted directly or indirectly to said first dash engagement piece in a manner such that said brake pedal is fully supported directly or indirectly by said first dash engagement piece;

(e) one or more steering column components mounted directly or indirectly to said first dash engagement piece in a manner such that a steering column assembly is primarily supported directly or indirectly by said first dash engagement piece when said driver control module is assembled;

(f) one or more brake valves mounted directly or indirectly to said first dash engagement piece;

(g) brake valve operating components which operatively connect said brake pedal to one or more of said one or more brake valves so that movement of said brake pedal causes actuation of said one or more of said one or more brake valves;

(h) wherein said one or more brake valves of said driver control module include a foot valve, and a parking control valve;

(i) wherein said driver control module includes all tubing connections between said foot valve and said parking control valve; and (j) wherein said driver control module is not yet engaged to the vehicle.

18. The driver control module of claim 17, wherein:

(a) said one or more brake valves are further comprised of a tractor protection valve; and (b) all tubing connections between said tractor protection valve, said foot valve and said parking control valve are included in said driver control module.

19. The driver control module of claim 18, further comprising:

(a) push-pull double check valves; and (b) tubing connections which connect said push-pull double check valves to said one or more brake valves of said driver control module.

20. A vehicle, comprising:

(a) a chassis;

(b) a suspension engaged to said chassis for supporting said chassis;

(c) a powertrain engaged to said chassis for causing movement of said vehicle;

(d) a cab engaged to said chassis for providing protection from the elements to occupants of said vehicle;

(e) a steering system engaged to said chassis, said suspension and said cab for controlling the direction of motion of said vehicle;

(f) a brake system engaged to said chassis, said suspension, said powertrain, and said cab for decreasing the velocity of said vehicle;

(g) a driver control module for engagement to said cab;

(h) a dash panel comprising a front portion of said cab;

(i) wherein said dash panel defines a first driver control module opening through itself;

(j) a first dash engagement piece which comprises a portion of said driver control module;

(k) wherein said first dash engagement piece is shaped to span said first driver control module opening in said dash panel of said vehicle;

(l) wherein said dash panel contains engagement means adjacent said first driver control module opening for engaging said first dash engagement piece to said dash panel;

(m) a brake pedal mounted directly or indirectly to said first dash engagement piece in a manner such that said brake pedal is fully supported directly or indirectly by said first dash engagement piece;

(n) one or more steering column components mounted directly or indirectly to said first dash engagement piece in a manner such that a steering column assembly is primarily supported directly or indirectly by said first dash engagement piece when said driver control module is assembled;

(o) one or more brake valves mounted directly or indirectly to said first dash engagement piece;

(p) brake valve operating components which operatively connect said brake pedal to one or more of said one or more brake valves so that movement of said brake pedal causes actuation of said one or more of said one or more brake valves;

(q) wherein said one or more steering column components include a steering column housing which supports a steering column steering shaft;

(r) wherein said first dash engagement piece defines a steering column opening through itself;

(s) wherein said steering column steering shaft extends through said steering column opening defined in said first dash engagement piece such that when said driver control module is assembled in said vehicle said steering column steering shaft extends beyond said first dash engagement piece to an outboard side of said first dash engagement piece;

(t) a pedestal stamping mounted to said first dash engagement piece;

(u) wherein at least one of said brake pedal, said steering column assembly, and said one or more brake valves directly or indirectly derive support from said pedestal stamping;

(v) wherein said pedestal stamping has at least two upstanding vertical mounting surfaces which are essentially parallel and are oriented such that, when said driver control module is installed within said vehicle, said upstanding vertical mounting surfaces are substantially parallel to a longitudinal axis of said vehicle;

(w) wherein each of said at least two upstanding vertical mounting surfaces defines a mounting hole for a tube;

(x) wherein a brake pedal tube is engaged to said brake pedal at a point of said brake pedal some distance from a foot contact surface of said brake pedal and is oriented with an axis of said brake pedal tube parallel to said foot contact surface of said brake pedal;

(y) wherein when said driver control module is assembled said brake pedal tube is located within said mounting holes defined by said upstanding vertical mounting surfaces and is thus supported perpendicularly between said upstanding vertical mounting surfaces with said axis of said brake pedal tube substantially coincident with an axis which intersects each of said mounting holes;

(z) wherein said brake pedal is free to rotate about said axis of said brake pedal tube and therefore also about said axis which intersects each of said mounting holes defined by said upstanding vertical supports;

(aa) wherein said brake valve operating components connect said brake pedal and one or more of said one or more brake valves;

(bb) wherein when said brake pedal is rotated about said axis of said brake pedal tube said brake valve operating components are driven by said brake pedal and in turn drive one or more components of said one or more of said one or more brake valves and thus cause actuation of respective ones of said one or more brake valves;

(cc) steering column engagement arms which are engaged to said upstanding vertical mounting surfaces and which are oriented substantially parallel to one another;

(dd) wherein said steering column assembly has engagement means for engaging said steering column assembly to said steering column engagement arms; and (ee) wherein said steering column assembly is engaged to said steering column engagement arms and said steering column assembly is primarily supported by said steering column engagement arms.

21. The vehicle of claim 20, wherein:

(a) said first dash engagement piece defines through itself one or more tubing routing openings.

22. The vehicle of claim 21, further comprising:

(a) an accelerator pedal assembly mounted directly or indirectly to said first dash engagement piece.

23. The vehicle of claim 22, further comprising:

(a) a through wall bushing which defines a central bore through itself is engaged to said first dash engagement piece and disposed such that said central bore of said through wall bushing is substantially aligned with said steering column opening defined by said dash piece; and (b) wherein said steering column steering shaft passes through said central bore of said through wall bushing.

24. The vehicle of claim 23, wherein:

(a) said one or more brake valves are mounted on an outboard side of said first dash engagement piece such that when said driver control module is assembled to said vehicle said one or more brake valves are located outside said cab;

(b) said first dash engagement piece defines a brake valve operating component opening through itself; and (c) said brake valve operating components are comprised of a member which protrudes through said brake valve operating component opening defined by said first dash engagement piece.

25. The vehicle of claim 24, further comprising:

(a) a single wiring harness which when connected to a mating wiring harness of said vehicle, provides all electrical connections needed for all components of said driver control module.

26. The vehicle of claim 25, further comprising:

(a) means for providing delivery of electrical power from outside said cab to inside said cab selected from the group consisting of a power stud and an electrical pass through opening defined in said first dash engagement piece.

27. The vehicle of claim 26, further comprising:

(a) a turn signal module engaged to said steering column assembly.

28. The vehicle of claim 27, wherein:

(a) said steering column engagement means for engaging said steering column assembly to said steering column engagement arms are integral to said steering column housing which comprises a portion of said steering column assembly.

29. The vehicle of claim 28, further comprising:

(a) one or more tubing routing devices for accommodating the assembly of tubing passageways from inside said cab to outside said cab;

(b) wherein said one or more tubing routing devices includes one or more tubing routing devices selected from the group consisting of fill in glands and blocks of push-to-connect type tubing fittings; and (c) wherein said one or more tubing routing devices are mounted within said one or more tubing routing openings defined in said first dash engagement piece.

30. The vehicle of claim 29, wherein:

(a) said upstanding vertical mounting surfaces define one or more switch slots for mounting switches to;

(b) one or more switches are mounted in said switch slots;

(c) said one or more switches cause illumination of brake lights of said vehicle when said brake pedal is operated;

(d) said one or more reed switches operate to terminate a cruise control mode of operation of said vehicle when said brake pedal and/or said clutch pedal are operated; and (e) said one or more switches are part of a starter interlock circuit of said vehicle.

31. The vehicle of claim 30, further comprising:
- (a) a clutch pedal which has a clutch pedal tube engaged to said clutch;
- (b) wherein said clutch pedal tube is located parallel to a clutch pedal foot contact surface at a point some distance from said clutch pedal foot contact surface;
- (c) wherein, when said driver control module is assembled, one of said clutch pedal tube and said brake pedal tube are disposed within the other in a tube inside a tube arrangement;
- (d) a pedal assembly bushing which defines through itself a substantially cylindrical inner bore and has a substantially cylindrical outer surface which is concentric to said inner bore;
- (e) wherein an inner one of said clutch pedal tube and said brake pedal tube is disposed within said inner bore of said pedal assembly bushing;
- (f) wherein said substantially cylindrical outer surface of said pedal assembly bushing is disposed within an inner bore of an outer one of said clutch pedal tube and said brake pedal tube when said driver control module is assembled; and
- (g) whereby said tube inside a tube arrangement of said brake pedal tube and said clutch pedal tube with said pedal assembly bushing installed, allows for substantially free rotation of said clutch pedal tube and said brake pedal tube relative to each other.

32. The vehicle of claim 31, wherein:
- (a) said engagement means for engaging said first dash engagement piece to said dash panel is comprised of a plurality of threaded fasteners fixedly attached to said first dash engagement piece.

33. The vehicle of claim 32, wherein:
- (a) engagement means are present in said driver control module for mounting different styles of said accelerator pedal assembly and mounting said accelerator pedal assembly in more than one location.

34. The vehicle of claim 33, further comprising:
- (a) a clock spring engaged to said steering column assembly for ensuring continuity of electricity to a collision event initiated driver air bag.

35. The vehicle of claim 34, further comprising:
- (a) a trailer brake hand control mounted to either said steering column assembly or one or both of said upstanding vertical mounting surfaces.

36. A driver control module for mounting as an assembled unit within a first driver control module opening in a dash panel of a cab of a vehicle which has a longitudinal ax-is, said driver control module comprising:
- (a) a first dash engagement piece;
- (b) wherein said first dash engagement piece is shaped to span the first driver control module opening in the dash panel of the vehicle;
- (c) wherein said first dash engagement piece has engagement means for engaging said first dash engagement piece to the dash panel of the vehicle;
- (d) a brake pedal mounted directly or indirectly to said first dash engagement piece in a manner such that said brake pedal is fully supported directly or indirectly by said first dash engagement piece;
- (e) one or more steering column components mounted directly or indirectly to said first dash engagement piece in a manner such that a steering column assembly is primarily supported directly or indirectly by said first dash engagement piece when said driver control module is assembled;
- (f) two upstanding vertical mounting surfaces that are engaged to said dash engagement piece, that extend parallel to one another as they extend away from said dash engagement piece and each of which defines a mounting hole for a tube;
- (g) wherein said brake pedal has a brake pedal tube engaged to it parallel to a foot contact surface of said brake pedal and at a point of said brake pedal some distance from said foot contact surface of said brake pedal tube;
- (h) a clutch pedal that has a clutch pedal tube engaged to it parallel to a foot contact surface of said clutch pedal and at a point at some distance from said foot contact surface of said clutch pedal;
- (i) wherein said brake pedal tube and/or said clutch pedal tube is/are located within said mounting holes defined by said upstanding vertical mounting surfaces;
- (j) wherein one of said clutch pedal tube and said brake pedal tube is disposed within the other in a tube inside a tube arrangement;
- (k) wherein said driver control module further comprises a pedal assembly bushing Which defines through itself a substantially cylindrical inner bore and has a substantially cylindrical outer surface which is concentric to said inner bore;
- (l) wherein an inner one of said clutch pedal tube and said brake pedal tube is disposed within said inner bore of said pedal assembly bushing;
- (m) wherein said substantially cylindrical outer surface of said pedal assembly bushing is disposed within an inner bore of an outer one of said clutch pedal tube and said brake pedal tube when said driver control module is assembled; and
- (n) whereby said tube inside a tube arrangement of said brake pedal tube and said clutch pedal tube with said pedal assembly bushing installed, allows for substantially free rotation of said clutch pedal tube and said brake pedal tube relative to each other.

* * * * *